(12) United States Patent
Tebib et al.

(10) Patent No.: US 12,298,073 B2
(45) Date of Patent: May 13, 2025

(54) METHOD AND APPARATUS FOR PRODUCING FROZEN PRODUCTS

(71) Applicants: Messer SE & Co. KGaA, Bad Soden (DE); Messer France S.A.S., Suresnes (FR)

(72) Inventors: Emir Tebib, Gressy (FR); Denis Beil, Niederkassel (DE)

(73) Assignees: Messer SE & Co. KGaA, Bad Soden (DE); Messer France S.A.S., Suresnes (FR)

( * ) Notice: Subject to any disclaimer, the term of this patent is extended or adjusted under 35 U.S.C. 154(b) by 0 days.

(21) Appl. No.: 18/564,460

(22) PCT Filed: May 30, 2022

(86) PCT No.: PCT/EP2022/064612
  § 371 (c)(1),
  (2) Date: Nov. 27, 2023

(87) PCT Pub. No.: WO2022/253755
  PCT Pub. Date: Dec. 8, 2022

(65) Prior Publication Data
  US 2024/0247858 A1  Jul. 25, 2024

(30) Foreign Application Priority Data
  Jun. 1, 2021 (DE) .................... 10 2021 002 813.9

(51) Int. Cl.
  *F25D 3/12* (2006.01)
  *A23B 2/80* (2025.01)

(52) U.S. Cl.
  CPC .............. *F25D 3/127* (2013.01); *A23B 2/803* (2025.01)

(58) Field of Classification Search
  CPC .......... F25D 3/12; F25D 3/127; F25D 13/067; A23B 2/803; A23B 2/88; A23B 4/09
  See application file for complete search history.

(56) References Cited

U.S. PATENT DOCUMENTS

| | | | |
|---|---|---|---|
| 3,214,928 A | 11/1965 | Oberdorfer | |
| 5,121,611 A | 6/1992 | Broderdorf et al. | |
| (Continued) | | | |

FOREIGN PATENT DOCUMENTS

| | | | | |
|---|---|---|---|---|
| EP | 1881082 A1 | * | 1/2008 | ........... B22D 21/007 |
| EP | 2594870 A1 | | 5/2013 | |
| (Continued) | | | | |

OTHER PUBLICATIONS

International Search Report and Written Opinion in PCT/EP2022/064612, dated Sep. 19, 2022, 6 pages.

*Primary Examiner* — Joseph F Trpisovsky
(74) *Attorney, Agent, or Firm* — Andrus Intellectual Property Law, LLP

(57) ABSTRACT

The invention relates to a method of producing frozen products in which a predetermined amount of carbon dioxide snow is produced and piled up to form a volume of snow. Subsequently, a mold impression is pressed into one surface of the snow volume, forming depressions into which at least one product to be cooled is filled. In a cooling device, the product in the snow volume is cooled through, while the snow volume itself gradually sublimates. The process and the device are particularly suitable for the production of individual quick freezing (IQF) products.

11 Claims, 1 Drawing Sheet

(56) References Cited

U.S. PATENT DOCUMENTS

| | | | |
|---|---|---|---|
| 5,494,692 A * | 2/1996 | Beyer | A23B 2/88 |
| | | | 426/106 |
| 5,715,688 A * | 2/1998 | Jones, III | A23L 3/363 |
| | | | 62/63 |
| 11,378,434 B2 | 7/2022 | Claeys et al. | |
| 2013/0125576 A1 * | 5/2013 | Newman | F25D 3/11 |
| | | | 62/380 |
| 2018/0058744 A1 | 3/2018 | Newman | |
| 2022/0243972 A1 | 8/2022 | Tebib et al. | |
| 2023/0124187 A1 | 4/2023 | Tebib et al. | |

FOREIGN PATENT DOCUMENTS

| | | | | |
|---|---|---|---|---|
| EP | 3222946 A1 | 9/2017 | | |
| EP | 3333521 A1 | 6/2018 | | |
| EP | 3433552 A1 | 1/2019 | | |
| WO | WO-2007012636 A1 * | 2/2007 | | F25D 3/12 |
| WO | 2010104526 A1 | 9/2010 | | |

* cited by examiner

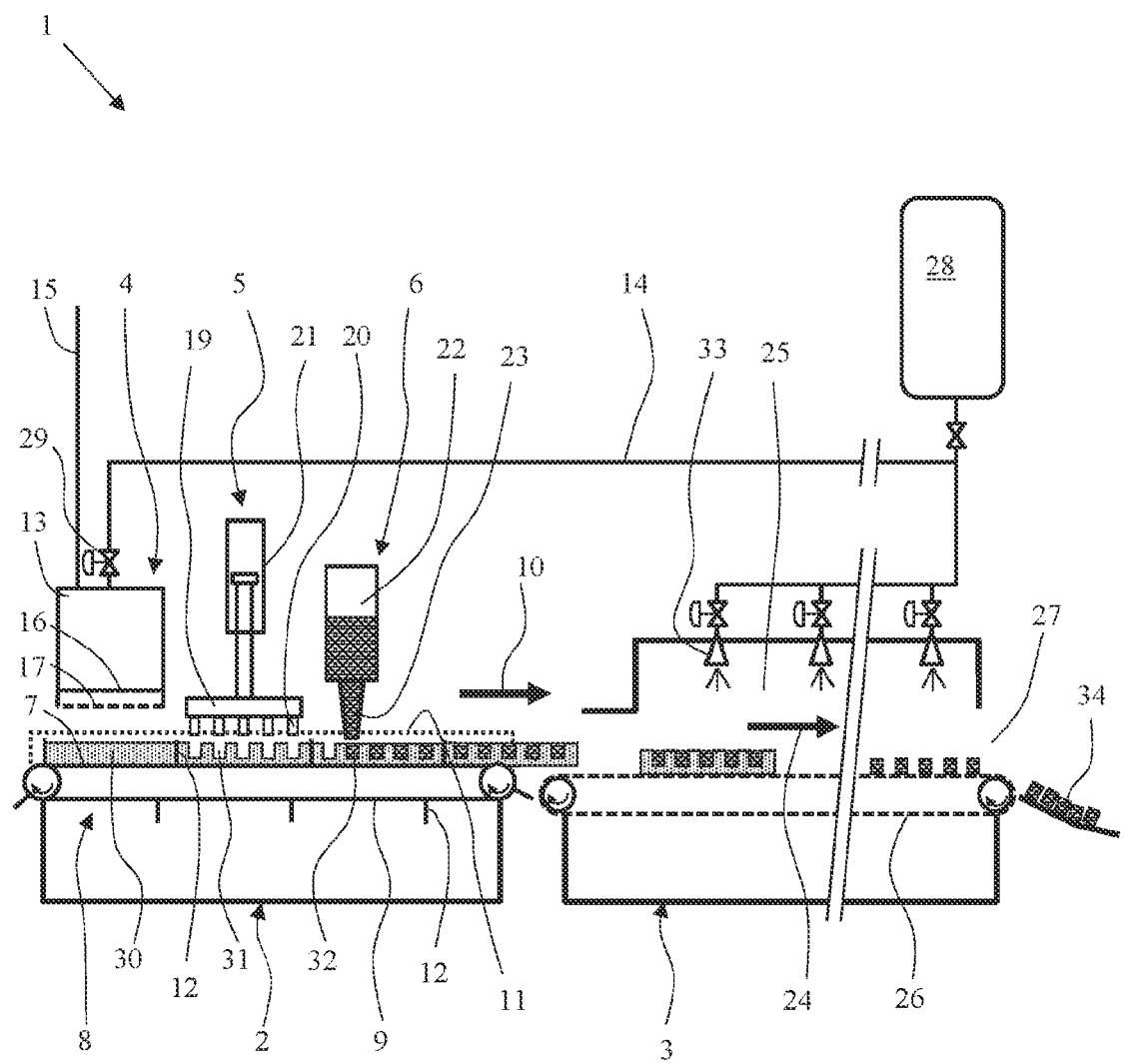

METHOD AND APPARATUS FOR PRODUCING FROZEN PRODUCTS

CROSS-REFERENCE TO RELATED APPLICATIONS

The present application is the U.S. national stage of international application PCT/EP2022/064612 filed May 30, 2022, which international application was published in the German language on Dec. 8, 2022, as International Publication WO 2022/253755 A1. The international application claims priority to German Patent Application No. 10 2021 002 813.9 filed Jun. 1, 2021.

FIELD

The invention relates to a method and an apparatus for producing frozen products, in particular for producing what are referred to as IQF (Individually Quick Frozen) products.

BACKGROUND

In order to ensure high product quality, in many cases temperature-sensitive products, in particular foodstuffs, pharmaceutical products, or biological or medical samples, have to be very rapidly cooled after their production to a storage temperature. In this connection, in particular the IQF method, in which the products have to be very rapidly cooled individually or in predefined portions, without freezing onto one another or being cooled too much or not enough, presents a great challenge.

One possibility for carrying out rapid cooling of individual products consists in depositing the products individually on a conveyor belt or framework and subsequently freezing them through in a cooling tunnel or freezer. However, in particular when cooling a large number of relatively small products, this is associated with an economically hardly justifiable outlay on time and work.

Another possibility is the use of immersion bath frosters, in which the products to be cooled are introduced separately from one another into a bath of liquid nitrogen. However, systems of this type have the disadvantage of using a large amount of refrigerant, and the large temperature gradient during the cooling process may lead to losses of quality in sensitive products.

It is furthermore known to introduce the products into molds or compartments which are constructed in such a manner that portions are formed separately from one another and are then frozen. This method can also be used if a liquid or molten starting product is intended to be frozen in portions. However, it requires an additional outlay for removing the frozen product from the molds or compartments and for the preparation and cleaning of them.

WO 2010/104526 A1, EP 2 594 870 A1 and EP 3 333 521 A1 disclose cooling tunnels which are equipped with mechanical devices, for example camshafts or vibrating screens, with which the products are brought into motion during the freezing process and are thus intended to be prevented from freezing onto one another. However, systems of this type cannot be used if liquid starting products are intended to be cooled in portions. In addition, it is not always the case that freezing together of the products is to be avoided.

SUMMARY

It is therefore the object of the present invention to specify a method and an apparatus for rapidly cooling products, in particular for producing IQF products, which method and apparatus overcome the disadvantages of the prior art and which are in particular also suitable for the production of frozen portions of liquid starting products.

This object is achieved by a method and/or apparatus having the features recited in the claims.

A method according to the invention is thus characterized in that a predetermined quantity of carbon dioxide snow is produced and piled up to form a volume of snow, a mold impression is pressed into a surface of the volume of snow, thus forming at least one depression in the volume of snow, at least one product to be cooled is placed into the at least one depression, and the volume of snow filled with the at least one product is supplied to a cooling device in which the product is cooled through.

According to the invention, carbon dioxide snow in a predetermined quantity is thus firstly produced. This is undertaken, for example, by a pressurized liquid carbon dioxide being expanded at an expansion nozzle so as to create a mixture of carbon dioxide snow and carbon dioxide gas, and the carbon dioxide snow subsequently being piled up to form a volume of snow. The volume of snow can be produced here either directly in situ, for example by means of a snow horn which is arranged above a working region in which the volume of snow is provided; in this case, the carbon dioxide snow which is produced drops directly into the working region. Or the snow is first of all produced in a separate device and subsequently supplied to the working region via a transport section of greater or lesser length. The working region in which the volume of snow is provided is formed either at a fixed location, with at least the means for forming the mold impression and for placing in the product being supplied successively to the working region, or the working region is formed movably, for example on a conveyor belt, and is supplied successively to the positionally fixed means for forming the mold impression, to the means for placing in the product and to the cooling device. Furthermore, means may be present which assist the formation of the volume of snow in the working region and, in particular during the piling up of the carbon dioxide snow, bring about a lateral boundary of the volume of snow produced, for example fixed or movable lateral wall elements or profile elements on a transport belt.

Subsequently, a mold impression is impressed into a surface of the volume of snow by means of a press. For this purpose, the press is equipped with a press mold which has at least one protruding profile which, during the pressing, leaves behind at least one depression in the volume of snow. The product is subsequently placed into the depression or into the plurality of depressions. By means of contact with the carbon dioxide snow, which is present at approximately −79° C., the product rapidly freezes at its surface. In the event of a plurality of depressions, the carbon dioxide snow present between the depressions effectively prevents mutual freezing together of the products. At the same time, the volume of snow as a whole is compressed by the pressing and is therefore stabilized for further treatment, in particular for further transport to the cooling device.

In the cooling device, an atmosphere is preferably maintained which has a temperature identical to or slightly above the sublimation temperature of carbon dioxide, and therefore the volume of snow gradually sublimates over the course of the cooling process and the frozen product which is now present in individual parts which are separated from one another remains, the individual parts subsequently being able to be packaged or supplied for further processing. For this reason, it is recommended also to operate the cooling device with liquid carbon dioxide which, for this purpose, can be extracted from the same source as was used for producing the volume of snow. However, it is not ruled out according to the invention that the carbon dioxide snow is removed only in a later method step; in this case, the temperature in the cooling device can also lie below the sublimation temperature of carbon dioxide.

The product can be a lumpy product, for example a fruit or a piece of vegetable, or can be a product which is liquid or pasty as it is being placed in and which is cast into the depression(s) of the mold impression and in this way is divided into portions, for example sauces, fruit juice or a previously melted, for example fat-containing product.

An apparatus according to the invention for producing frozen products has at least the following components (also called "stations" below): a device for providing a volume of snow, a press which is equipped with a press mold having at least one protruding profile and intended for impressing a mold impression into a surface of the volume of snow, thus forming at least one depression, a metering device for feeding at least one product into the at least one depression and a cooling device for final cooling of the product through.

The device for providing a volume of snow preferably comprises a device for producing a predetermined quantity of carbon dioxide snow, in which carbon dioxide snow is produced by expansion of liquid carbon dioxide introduced under pressure. For example, this involves a snow horn which is arranged above a working region determined for providing the volume of snow, and therefore the carbon dioxide snow produced in the snow horn drops onto the working region under the action of gravity and forms the volume of snow. The snow horn is attached to a liquid carbon dioxide supply line which contains a valve by means of which the quantity of the carbon dioxide fed to the snow horn can be controlled.

In a particularly preferred alternative refinement, the volume of snow is produced in a separate device and is then fed to the working region in which the volume of snow is provided. For example, an apparatus for metering carbon dioxide snow, as is described in more detail in EP 3 222 946 A1 or EP 3 433 552 A1, can be used. In these cases, expansion of liquid carbon dioxide introduced via a supply line results in the continuous production of carbon dioxide snow in a storage container where it is temporarily stored. The storage container is equipped with a discharge unit, by means of which a defined quantity of carbon dioxide snow is separated off at defined time intervals from the quantity of snow collected in the storage container, is ejected out of a lateral or bottom opening in the storage container and transported to the working region, for example by means of a chute or a conveyor belt, or drops onto the working region, and forms the volume of snow there. The carbon dioxide gas arising during the expansion of the liquid carbon dioxide is also separated in the storage container from the carbon dioxide snow, thus before the latter is supplied to the working region. As a result, firstly, it is avoided that the piling up of the volume of snow in the working region is disturbed by possible turbulent gas flows and, secondly, safe removal of the carbon dioxide gas is ensured. With an arrangement of this type, in particular even a multiplicity of volumes of snow can be provided in a rapid cycle frequency in succession.

In order to facilitate the piling up of the carbon dioxide snow, a vessel, into which the carbon dioxide snow is introduced, can be located in the working region. The term "vessel" should be understood in very general terms here and is intended to refer to any means, which may only be present temporarily, into which a volume of snow can be placed. For example, it can be a container which is closed on the bottom side and at its side walls. However, it is also conceivable that means for the lateral and/or bottom-side delimitation of the volume of snow, for example movable or flexible boundary elements, are provided only during the production of the volume of snow. In particular, such means can also be realized by parts of a conveyor belt on which the volume of snow passes through the stations or individual stations of the stations of the apparatus according to the invention. For example, they can be lug profiles which are arranged at equal distances on the conveyor belt, protrude from the upper strand of the conveyor belt and interact with lateral boundary elements for piling up the carbon dioxide snow to form the volume of snow; said boundary elements can also be arranged on the conveyor belt or laterally with respect to the conveyor belt.

The press comprises a motor-driven, for example pneumatically operated, drive unit and a press mold. The press mold which is equipped with one or more protruding profiles serves to impress a mold impression into a surface of the volume of snow, the mold impression having a depression or depressions corresponding to the profile or the profiles. A depression is adapted in particular to the shape of an individual product, in particular IQF product; when the apparatus according to the invention is used for freezing a product which is liquid or pasty when being placed in, a depression of the mold impression is preferably a casting mold which, after freezing, forms the shape of the frozen product.

The metering device is subsequently used to place a product into the depression(s) of the mold impression, i.e. either as an individual piece or as a predetermined quantity of a liquid, molten, pasty or mushy product.

The cooling device serves to completely cool through the product placed in the depression or the depressions of the mold impression, or the products placed therein. In the cooling device, an atmosphere is preferably maintained, the temperature of which is equal to or slightly above the sublimation temperature of carbon dioxide, and therefore the volume of snow gradually sublimates during the cooling process and the product which is now present in solid pieces which are separate from one another remains.

In a particularly advantageous refinement of the invention, the device for producing carbon dioxide snow, the press and the metering device and optionally also the cooling device are arranged along a transport device which is equipped with transport means for transporting the volume of snow. For example, the transport means involve a conveyor belt on which first of all the volume of snow is produced and on which subsequently the volume of snow is supplied to the press and the metering device. As a result, the same transport means can also transport the volume of snow or the products accommodated therein into or through the cooling device; however, a preferred embodiment makes provision to functionally separate the cooling device from the other stations. In this embodiment, separate transport apparatuses are therefore provided for the cooling device, on the one hand, and for the other stations of the apparatus, on the other hand. In this way, said stations can be combined with different cooling devices; in particular, in this case, a cooling device which is already present at a customer's premises can continue to be used as the cooling device.

A cooling tunnel, for example in the form of a linear froster or a spiral froster, is used as a preferred cooling device. The cooling tunnel is preferably operated with liquid carbon dioxide as a cooling medium; however, other cooling concepts are also conceivable, for example with cold air or liquid nitrogen as the cooling medium.

In an expedient embodiment of the apparatus according to the invention, the press is equipped with an exchangeable press mold. The press mold can therefore be detached from the press as required and replaced by a press mold which leaves behind a different mold impression in the volume of snow. As a result, the apparatus can be adapted to different cooling tasks and in particular used for producing different IQF products.

A preferred use of the invention consists in rapidly freezing foodstuff products or pharmaceutical or biotechnical products. In particular, the invention is suitable for the rapid cooling of individual products (IQF products). For example, the invention is suitable for producing products which can be divided into portions, for example liquid or pasty foodstuffs, such as sauces, soups, juices or cooked vegetables, which can be stored at a freezing temperature (−18° C.) and can be removed from the packaging in individual portions for use.

BRIEF DESCRIPTION OF THE DRAWING

An exemplary embodiment of the invention will be explained in more detail with reference to the drawing. The single drawing schematically shows an apparatus according to the invention.

DETAILED DESCRIPTION

The apparatus 1 shown in FIG. 1 for producing frozen products, in particular IQF products, is constructed in the exemplary embodiment shown here in two parts, with a mold and metering unit 2 and a cooling device 3.

The mold and metering unit 2 comprises a device 4 for providing carbon dioxide snow, a press 5, a metering device 6, and a transport apparatus 8.

The transport apparatus 8 is equipped with a revolving conveyor belt 9, the upper strand 7 of which runs below the device 4, the press 5 and the metering device 6 and, during operation, is moved in the running direction indicated by the arrow 10. The conveyor belt 9 slides between two fixedly mounted vertical side members of the transport apparatus 8, of which here only the rear side member 11 is indicated. Sealing means (not shown here) can be provided at least in the region of the device 4, the sealing means producing, between the conveyor belt 9 and side members 11, a transition which is impermeable at least to carbon dioxide snow particles, but without impairing the mobility of the conveyor belt 9. On its revolving outer surface, the conveyor belt 9 is equipped with lug profiles 12 which are arranged at equal distances, protrude vertically from the upper strand 7 of the conveyor belt and consist of a flexible and cold-resistant material, for example Teflon.

For example, a device for providing carbon dioxide snow may be a snow horn which is arranged above the conveyor belt 9 and in which the carbon dioxide snow produced in it drops directly onto the surface of the conveyor belt 9 enclosed between the side members 11 and two adjacent lug profiles 12.

In the refinement shown here, the device 4 comprises a storage container 13, within which a mixture of carbon dioxide gas and carbon dioxide snow is produced by expansion of liquid carbon dioxide which is introduced via a supply line 14. While the carbon dioxide gas is removed via an exhaust line 15 and optionally supplied for further use, the carbon dioxide snow collects in the bottom region of the storage container 9. Located there is a discharge unit 16 in which a precisely metered quantity of carbon dioxide snow can be measured and placed onto the conveyor belt 9 via a discharge opening 17 which can be opened and closed by means of a device (not shown here). For example, the discharge opening 17 is arranged directly above the upper strand 7 of the conveyor belt 9 and the metered quantity of snow drops onto the conveyor belt 9, or the discharge opening 17 is located laterally with respect to the conveyor belt 9 and the metered quantity of snow is transported by means (not shown here), for example a chute or a transport belt, to the conveyor belt 9. The side members 11 and respectively adjacent lug profiles 12 on the conveyor belt 9 prevent the supplied carbon dioxide snow from escaping laterally and thus form a vessel which enables the carbon dioxide snow to pile up to form a volume of snow. A volume enclosed by the side members 11 and two adjacent lug profiles 12 of the conveyor belt 9 is therefore referred to below as a "vessel".

Furthermore, a device for providing carbon dioxide snow may also be a snow horn or a feed funnel charged with carbon dioxide snow, which snow horn or feed funnel is arranged above the conveyor belt 9 and, in the case thereof, the carbon dioxide snow produced or fed therein drops directly into the vessel (not shown here).

The press 5 comprises a press mold 19 which is equipped with protruding profiles 20 and consists of a solid material, for example stainless steel, the base area of which virtually corresponds to the surface (i.e. the surface of the vessel) enclosed by two consecutive lug profiles 12 and the side members 6. The profiles 20 arranged on the press mold 19 are in the shape, for example, of cylinders or cubes and correspond in their size to production units of frozen products. The press mold 19 is mounted releasably on the press 5 and may be exchanged, if required, for example for producing other products, for a correspondingly different press mold. The press mold 19 is operatively connected in a manner which is known per se and is not of interest here to a, for example, pneumatically operated drive unit 21.

In the exemplary embodiment shown here, the metering device 6 comprises a reservoir 22 for a liquid or liquefied, for example molten, product and a metering funnel 23 attached to it.

The cooling device 3 is an apparatus with a cooling chamber 25 in which a cold atmosphere is maintained. For example, it is a cooling tunnel (only partially illustrated here with its starting and end sections), in which the products to be cooled are conveyed by means of a transport device 26 through the cooling chamber 25 in the direction of the arrow 24 to an outlet 27.

During the operation of the apparatus 1, liquid carbon dioxide from a tank 28 is introduced via the supply line 14 and expanded in the device 4. The time and duration can be set at a motor-controlled valve 29 by means of a controller (not shown here). During the expansion of the liquid carbon dioxide, a mixture of carbon dioxide snow and carbon dioxide gas is produced in the storage container 13. While the carbon dioxide gas is removed via the exhaust line 15, the carbon dioxide snow collects at the bottom of the storage container 13. A metered quantity of carbon dioxide snow is administered there by means of the discharge unit 16 into a vessel bounded by in each case two successive lug profiles 12 and the two side members 11 and piles up in said vessel to form a volume of snow 30.

By means of the movement of the conveyor belt 9 together with its lug profiles 12 in the direction of the arrow 10, the volume of snow 30 is transported to the press 5. There, the press mold 19 with the profiles 20 is briefly pressed into the volume of snow 30 and leaves behind a number of depressions 31, the shape and configuration of which correspond to the profiles 20, in the volume of snow 30. After the depressions 31 are formed, the volume of snow 30 is transported by means of the transport device 8 to the metering device 6 at which the depressions 31 are filled with liquid product 32. Upon contact of the liquid product 32 with the surrounding carbon dioxide snow, which is present at a temperature of approx. $-78.9°$ C., at the edges of the depression 31, the product 32 freezes very rapidly at least at its surface. The volume of snow 30 provided with the filled depressions 31 is subsequently transported to the cooling device 3.

The cold atmosphere present in the cooling chamber 25 of the cooling device 3 serves to cool through the still partially liquid product 32 located in the depressions 31. The cold atmosphere is brought about by supplying a refrigerant; in the exemplary embodiment shown here, cryogenic refrigerant is supplied at nozzles 33 which are arranged in the ceiling region of the cooling chamber 25. The cryogenic refrigerant, as in the exemplary embodiment shown here, may also be a liquid carbon dioxide which is removed from the tank 28; however, it is also conceivable to use a different refrigerant, for example liquid nitrogen, or a different method for producing cold in the cooling device. The temperature of the atmosphere in the cooling chamber should be equal to or slightly above the sublimation temperature of carbon dioxide, i.e., for example, between $-60°$ C. and $-78°$ C.

During the passage through the cooling chamber 25, the volume of snow 30 gradually sublimates to form carbon dioxide gas which is extracted in a manner not shown here by means of an extraction system present in the cooling device 3. At the outlet 27 of the cooling device 3, there are therefore only individual, completely frozen-through end products 34 which are transported away and supplied for further processing or packaging.

The cooling device 3 can furthermore also be an integral part of the apparatus 1 and can be connected in particular to the same transport apparatus 8 as the other stations; the functional separation shown here of mold and metering unit 2 and cooling device 3 enables, however, the combination of a mold and metering unit 2 with a cooling device which is already present at a customer's premises.

The invention claimed is:

1. A method for producing frozen products, in which:
 a predetermined quantity of carbon dioxide snow is produced and a volume of snow is provided from the predetermined quantity of carbon dioxide snow;
 a mold impression is pressed into a surface of the volume of snow, thus forming at least one depression in the volume of snow;
 at least one product to be cooled is placed into the at least one depression; and
 the volume of snow filled with the at least one product is supplied to a cooling device in which the at least one product is cooled through.

2. The method as claimed in claim 1, wherein in the cooling device a temperature is maintained at which the volume of snow sublimates to form carbon dioxide gas.

3. The method as claimed in claim 1, wherein in order to produce the volume of snow, pressurized liquid carbon dioxide is expanded at an expansion nozzle and the carbon dioxide snow produced in the process is piled up in a vessel.

4. The method as claimed in claim 1, wherein the at least one product placed into the at least one depression is a lumpy product or a product which is liquid or pasty as it is being placed therein.

5. The use of a method as claimed in claim 1 for rapidly freezing foodstuff products or pharmaceutical or biotechnical products, in particular individual quick freezing products.

6. An apparatus for producing frozen products, having:
 a device for providing a carbon dioxide volume of snow;
 a press which is equipped with a press mold having at least one protruding profile and intended for impressing a mold impression into a surface of the volume of snow, thus forming at least one depression;
 a metering device for filling at least one product into the at least one depression; and
 a cooling device for cooling the at least one product through.

7. The apparatus as claimed in claim 6, wherein the device for providing the volume of snow comprises a snow horn which is attached to a supply line for liquid carbon dioxide and is equipped with an expansion nozzle and is arranged above a working region in order to provide the volume of snow.

8. The apparatus as claimed in claim 6, wherein the device for providing the volume of snow comprises a storage container for storing carbon dioxide snow, and a discharge unit for discharging a metered quantity of carbon dioxide snow stored in the storage container and transporting the metered quantity of carbon dioxide snow to a working region in order to provide the volume of snow.

9. The apparatus as claimed in claim 6, wherein the device for providing carbon dioxide snow, the press and the metering device are arranged along a transport device which is equipped with means for transporting the volume of snow.

10. The apparatus as claimed in claim 6, wherein a cooling tunnel is used as the cooling device.

11. The apparatus as claimed in claim 6, wherein the press mold is mounted exchangeably on the press.

* * * * *